(12) United States Patent
Kurashima

(10) Patent No.: US 8,598,896 B2
(45) Date of Patent: Dec. 3, 2013

(54) ELECTROSTATIC CAPACITANCE-TYPE INPUT DEVICE, METHOD OF TESTING ELECTROSTATIC CAPACITANCE-TYPE INPUT DEVICE, AND DRIVING DEVICE FOR ELECTROSTATIC CAPACITANCE-TYPE INPUT DEVICE

(75) Inventor: Takeshi Kurashima, Nagano (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 316 days.

(21) Appl. No.: 12/961,843

(22) Filed: Dec. 7, 2010

(65) Prior Publication Data

US 2011/0140720 A1 Jun. 16, 2011

(30) Foreign Application Priority Data

Dec. 15, 2009 (JP) ................. P2009-283727

(51) Int. Cl.
*G01R 27/26* (2006.01)
*G06F 3/041* (2006.01)
(52) U.S. Cl.
USPC .......................................... 324/686; 345/173
(58) Field of Classification Search
USPC ....................................................... 324/686
See application file for complete search history.

(56) References Cited

U.S. PATENT DOCUMENTS

| 5,335,230 A * | 8/1994 | Crooks et al. .................... 714/48 |
| 7,138,805 B2 * | 11/2006 | Ishioka et al. ................ 324/658 |
| 2010/0007615 A1 * | 1/2010 | Wu et al. ........................ 345/173 |
| 2010/0123670 A1 * | 5/2010 | Philipp ......................... 345/173 |
| 2010/0188347 A1 * | 7/2010 | Mizuhashi et al. ........... 345/173 |

FOREIGN PATENT DOCUMENTS

JP 2004-191381 7/2004

* cited by examiner

*Primary Examiner* — Jeff Natalini
(74) *Attorney, Agent, or Firm* — K&L Gates LLP

(57) ABSTRACT

An electrostatic capacitance-type input device includes: a plurality of first electrodes, which detect an input position, extending in a first direction in an input area on a substrate; a plurality of second electrodes, which detect an input POSITION, extending in a second direction intersecting with the first direction in the input area; a plurality of signal wirings that extend from one-side end portions of the first electrodes and one-side end portions of the second electrodes on the substrate; a test electrode that faces the other-side end portions of at least one of the first electrodes and the second electrodes through an insulating film on the substrate; and a test wiring that is electrically connected to the test electrode.

9 Claims, 11 Drawing Sheets

ELECTROSTATIC CAPACITANCE-TYPE INPUT DEVICE, METHOD OF TESTING ELECTROSTATIC CAPACITANCE-TYPE INPUT DEVICE, AND DRIVING DEVICE FOR ELECTROSTATIC CAPACITANCE-TYPE INPUT DEVICE

CROSS REFERENCES TO RELATED APPLICATIONS

The present application claims priority to Japanese Priority Patent Application JP 2009-283727 filed in the Japan Patent Office on Dec. 15, 2009, the entire contents of which is hereby incorporated by reference.

BACKGROUND

The present application relates to an electrostatic capacitance-type input device that detects an input position based on a change in the electrostatic capacitance coupled with an input position detecting electrode, a method of testing the electrostatic capacitance-type input device, and a driving device for an electrostatic capacitance-type input device. Among electronic apparatuses such as cellular phones, car navigation systems, personal computers, ticket-vending machines, and banking terminals, there are apparatuses, in which an input device termed a touch panel is arranged on the surface of a liquid crystal device or the like, allowing a user to input information while referring to an image displayed in an image display area of the liquid crystal device. Among such input devices, electrostatic capacitance-type input devices, as schematically shown in FIG. 11, have a plurality of first electrodes 211 that extend in the X direction and are used for detecting an input position, a plurality of second electrodes 212 that extend in the Y direction and are used for detecting an input position, and a plurality of signal wirings 27 that extend from one-side end portions of the first electrodes 211 and one-side end portions of the second electrodes 212 on a substrate 20 and monitor electrostatic capacitance that is coupled with each of the first electrodes 211 and the second electrodes 212 through a signal wiring 27. Thus, when a finger is in proximity to any of the first electrodes 211 and the second electrodes 212, the electrostatic capacitance of the electrode to which the finger is in proximity increases by the amount corresponding to electrostatic capacitance generated between the finger and the electrode. Accordingly, the electrode to which the finger is in proximity can be specified.

In such electrostatic capacitance-type input devices, when a short circuit is formed in one spot in the first electrode 211 or the second electrode 212, it is difficult to detect the input position in the corresponding row. Accordingly, detecting whether a short circuit is formed in the first electrodes 211 and the second electrodes 212 is important in terms of securing the reliability of the electrostatic capacitance-type input devices.

As a method of testing formation of a short circuit in the electrodes, a test method in which a sensor electrode is brought to be in proximity to a plurality of electrodes one after another, and coupled capacitance between the sensor electrode and the corresponding electrode is monitored is proposed (for example, see JP-A-2004-191381).

SUMMARY

However, according to the method described in JP-A-2004-191381, the sensor electrode is brought to be in proximity to a plurality of electrodes one after another by a SCARA robot. Accordingly, a test device of a large scale is necessary. In addition, in the case of an electrostatic-type input device, capacitance coupled with the first electrode 211 and the second electrode 212 is already present. Thus, even when formation of a short circuit occurs, a difference between the capacitance of a normal electrode and the capacitance of a short-circuited electrode is small. Therefore, there is a problem in that it is difficult to identify the occurrence of a short circuit.

Thus, it is desirable to provide an electrostatic capacitance-type input device, a method of testing the electrostatic capacitance-type input device capable of reliably detecting whether or not a short circuit is formed in the electrodes used for detecting an input position without using a large-scale test device, and a driving device for an electrostatic-type input device capable of implementing such a test method.

According to an embodiment, there is provided an electrostatic capacitance-type input device including: a plurality of first electrodes, which detect an input position, extending in a first direction in an input area on a substrate; a plurality of second electrodes, which detect an input position, extending in a second direction intersecting with the first direction in the input area; a plurality of signal wirings that extend from one-side end portions of the first electrodes and one-side end portions of the second electrodes on the substrate; a test electrode that faces the other-side end portions of at least one of the first electrodes and the second electrodes through an insulating film on the substrate; and a test wiring that is electrically connected to the test electrode.

In addition, according to another embodiment, there is provided a method of testing an electrostatic capacitance-type input device including a plurality of first electrodes, which detect an input position, extending in a first direction in an input area on a substrate, a plurality of second electrodes, which detect an input position, extending in a second direction intersecting with the first direction in the input area; and a plurality of signal wirings that extend from one-side end portions of the first electrodes and one-side end portions of the second electrodes on the substrate. A test electrode that faces the other-side end portions of at least one of the first electrodes and the second electrodes through an insulating film and a test wiring that is electrically connected to the test electrode are disposed. The above-described method includes the steps of: measuring capacitance values between the test wiring and the plurality of signal wirings; and determining that the electrode out of the first electrodes and the second electrodes, which has a capacitance value equal to or less than a set value, and to which the signal wirings are electrically connected is short-circuited.

In an embodiment, the test electrode that faces the other-side end portions of at least one of the first electrodes and the second electrodes through the insulating film on the substrate and the test wiring that is electrically connected to the test electrode are included. Accordingly, by measuring the capacitance values between the test wiring and a plurality of the signal wirings, it can be determined that formation of a short circuit occurs in the electrode to which the signal wiring having a capacitance value equal or less than the set value is electrically connected. According to such a configuration, in a case where capacitance is coupled with the first electrode or the second electrode, when a shot-circuit is formed, capacitance between the test wiring and the signal wirings is not detected at all or is detected to be extremely low. Accordingly, formation of a circuit in the electrode can be reliably detected even in a case where capacitance coupled with the first electrode or the second electrode is already present. In addition, since the capacitance values between the test wiring and the signal wirings that are formed on the substrate are measured, there is an advantage in that a large-scale test device is not necessary. Furthermore, since a capacitance value between the first electrode or the second electrode and the test electrode is constant and small, the detection of a position is not hindered by disposing the test electrode.

In an embodiment, it is preferable that the test electrode overlaps the other-side end portions in a thickness direction through the insulating film so as to face the other-side end portions. In such a case, since the first electrode or the second electrode and the test electrode can be combined with capacitance of an appropriate capacitance value, the capacitance value between the test wiring and the signal wirings can be reliably measured.

In an embodiment, it is preferable that a relay electrode that electrically connects the second electrodes disconnected in intersection portions to each other on the substrate is further included, the second electrodes are disconnected in the intersection portions with the first electrodes, and the test electrode is disposed at least in the other-side end portions of the second electrodes. In such a case, it can be detected whether or not a short circuit is formed in the second electrodes, in which formation of a short circuit may easily occur, out of the first electrodes and the second electrodes.

In an embodiment, it is preferable that the test electrode is disposed in the other-side end portion of the first electrodes and the other-side end portion of the second electrodes. In such a case, it can be detected whether formation of a short circuit occurs in both the first electrodes and the second electrodes.

In an embodiment, it is preferable that the test electrode is independently disposed for each of the other-side end portions, and the test wiring is electrically connected to a plurality of the test electrodes. In addition, in the embodiment, it is preferable that the test wiring is electrically connected to all the test electrodes. In such a case, since the number of the test wirings can be suppressed to a minimum, a space used for disposing the test wiring may be small.

In an embodiment, it is preferable that the test wiring extends so as to surround at least three sides of the input area. In such a case, since the test wiring can be used as a shield wiring, penetration of an electromagnetic wave noise into the input area can be prevented.

In an embodiment, it is preferable that a short-circuit testing unit that is electrically connected to the test wiring and the plurality of signal wirings is further included, and the short-circuit testing unit measures capacitance values between the test wiring and the plurality of signal wirings and determines that the electrode out of the first electrodes and the second electrodes, which has a capacitance value equal to or less than a set value, and to which the signal wirings are electrically connected is short-circuited. In such a case, formation of a short circuit can be detected by the electro-static capacitance-type input device without using a test device.

Such a test method can be performed by a driving device for an electrostatic capacitance-type input device. In other words, according to another embodiment, there is provided a driving device for an electrostatic capacitance-type input device including a plurality of first electrodes, which detect an input position, extending in a first direction in an input area on a substrate, a plurality of second electrodes, which detect an input position, extending in a second direction intersecting with the first direction in the input area; and a plurality of signal wirings that extend from one-side end portions of the first electrodes and one-side end portions of the second electrodes. The driving device includes: a plurality of signal terminals that output position detecting signals to the signal wirings; a driving unit that supplies position detecting signals to the signal terminals; a test terminal; a capacitance measuring unit that measures capacitance values between the test terminal and the plurality of signal terminals; and a short-circuit determining unit that determines whether or not there is the signal terminal having a capacitance value equal to or less than a set value based on a capacitance measuring result of the capacitance measuring unit. In such a case, formation of a short circuit can be detected by the driving device for an electrostatic capacitance-type input device without using a test device.

The electrostatic capacitance-type input device according to the embodiment, for example, can be used for configuring an input device-attached electro-optical apparatus. In the input device-attached electro-optical apparatus, an electro-optical panel used for generating an image is configured on a side of the substrate that is opposite to the input operation side thereof.

An electro-optical apparatus with the input device according to the embodiment can be used in electronic apparatuses such as a cellular phone, a car navigation system, a personal computer, a ticket-vending machine, and a banking terminal.

Additional features and advantages are described herein, and will be apparent from the following Detailed Description and the figures.

DETAILED DESCRIPTION

Embodiments of the present application will be described below in detail with reference to the drawings.

Embodiments

Entire Configuration of Input Device-Attached Electro-Optical Apparatus

Figure 1A:
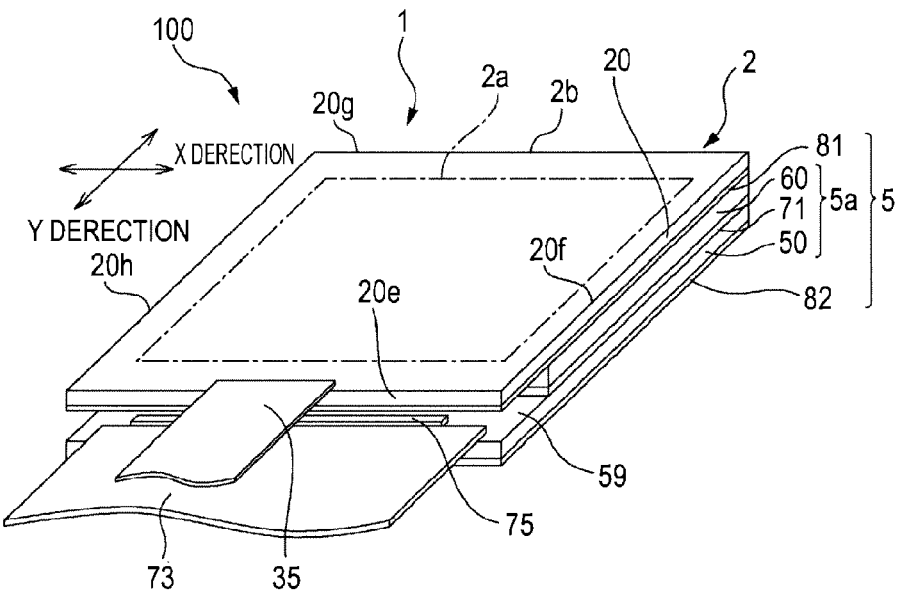
FIGS. 1A to 1C are explanatory diagrams of an electrostatic capacitance-type input device according to an embodiment.
Figure 1B:
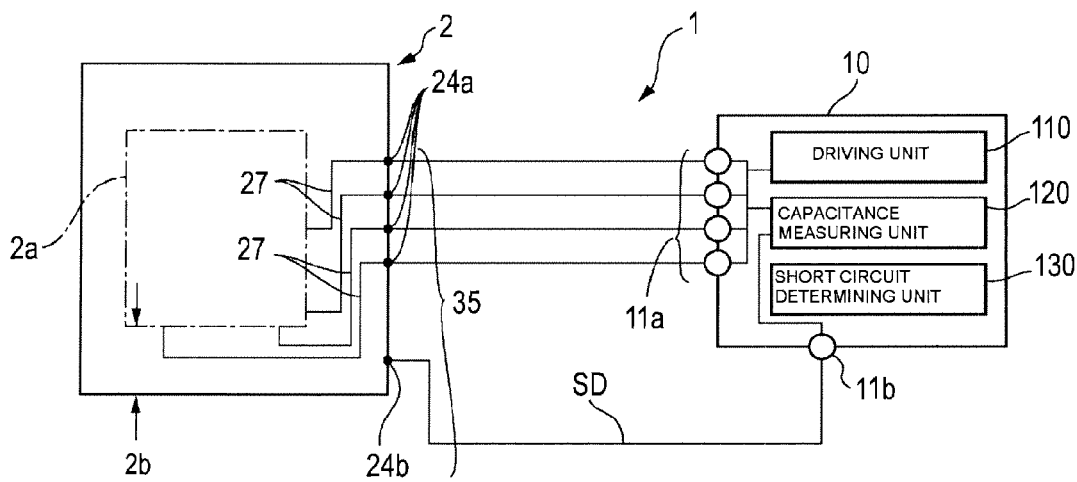
Figure 1C:
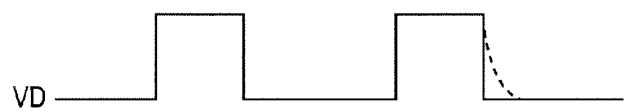
Figure 2A:
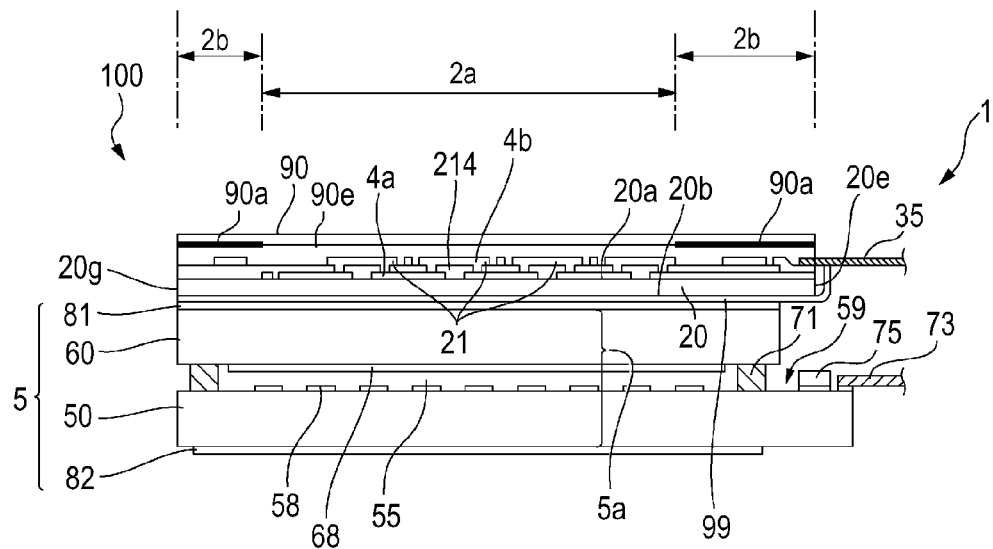
FIGS. 2A and 2B are explanatory diagrams schematically showing the cross-sectional configurations of input device-attached electro-optical apparatuses according to Embodiment 1 of the present application.
Figure 2B:
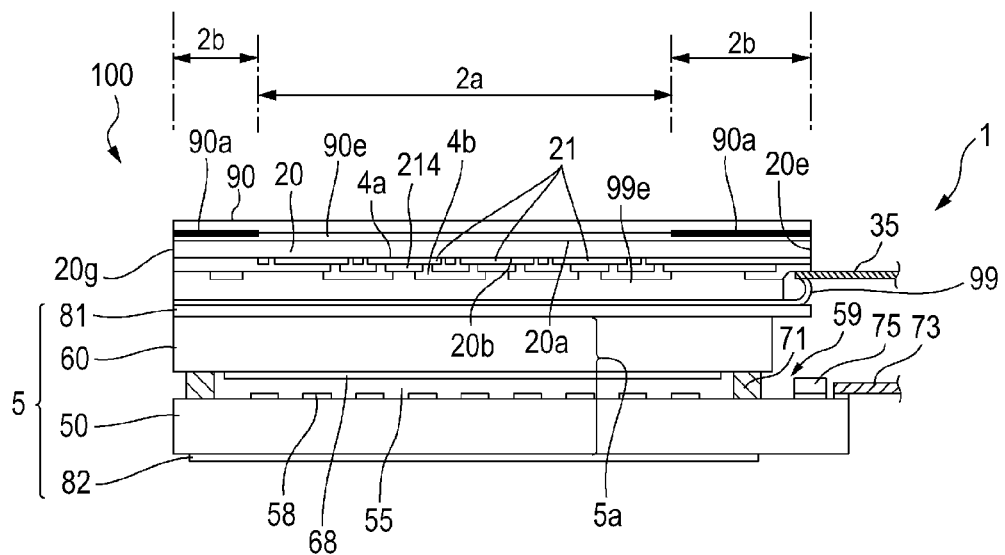

FIGS. 1A to 1C are explanatory diagrams of an electrostatic capacitance-type input device according to an embodiment. FIG. 1A is an explanatory diagram schematically showing the entire configuration of an input device-attached electro-optical apparatus including the electrostatic capacitance-type input device of this embodiment. FIG. 1B is an explanatory diagram schematically showing the electric configuration of the electrostatic capacitance-type input device. FIG. 1C is an explanatory diagram of an electric potential supplied to the electrostatic capacitance-type input device. FIGS. 2A and 2B are explanatory diagrams schematically showing the cross-sectional configurations of input device-attached electro-optical apparatuses according to Embodiment 1 of the present application. FIG. 2A is an explanatory diagram of a configuration example in which input position detecting electrodes are disposed on the first face side of a substrate that is located on the input operation side thereof. FIG. 2B is an explanatory diagram of a configuration example in which the input position detecting electrodes are disposed on the second face side of the substrate that is located on a side opposite to the input operation side of the substrate.

As shown in FIG. 1A, generally, the input device-attached input apparatus 100 of this embodiment has an image generating device 5 that is configured by a liquid crystal device or the like and an electrostatic capacitance-type input device 1 disposed on a face of the image generating device 5 that is located on a side, from which display light is emitted, in an overlapping manner. The electrostatic capacitance-type input device 1 includes an input panel 2 (touch panel), and the image generating device 5 includes a liquid crystal panel serving as an electro-optical panel 5a (display panel). In this embodiment, both the input panel 2 and the electro-optical panel 5a have a planar shape of a rectangle, and the center area of the electrostatic capacitance-type input device 1 and the input device-attached electro-optical apparatus 100 in the plan view is an input area 2a. An area of the image generating device 5 and the input device-attached electro-optical apparatus 100 that overlaps the input area 2a in the plan view is an image forming area. A flexible wiring substrate 35 is connected to the side of the input panel 2 on which an end portion 20e is positioned. In addition, a flexible wiring substrate 73 is connected to the side of an electro-optical panel 5a on which the end portion 20e is positioned.

In FIGS. 1A and 1B and FIGS. 2A and 2B, the image generating device 5 is an active matrix-type liquid crystal display device of transmission type or semi-transmission reflection type. On a side (a side opposite to the display light emitting side) of the electro-optical panel 5a that is opposite to a side on which the input panel 2 is disposed, a back light device (not shown in the figure) is disposed. The back light device, for example, has a light guiding plate, which has translucency, disposed on a side of the electro-optical panel 5a that is opposite to the side on which the electrostatic capacitance-type input device 1 is disposed in an overlapping manner and a light source such as a light emitting diode that emits white light or the like toward a side end portion of the light guiding plate. After light emitted from the light source is incident from the side end portion of the light guiding plate, the light is emitted toward the electro-optical panel 5a while propagating inside the light guiding plate. Between the light guiding plate and the electro-optical panel 5a, a sheet-shaped optical member such as a light scattering sheet or a prism sheet may be disposed.

In the image generating device 5, on the display light emitting side of the electro-optical panel 5a, a first polarizing plate 81 is disposed in an overlapping manner. In addition, on the opposite side of the electro-optical panel 5a, a second polarizing plate 82 is disposed in an overlapping manner. The electro-optical panel 5a includes a translucent component substrate 50 that is disposed on a side opposite to the display light emitting side and a translucent opposing substrate 60 that is disposed on the display light emitting side so as to oppose the component substrate 50. The opposing substrate 60 and the component substrate 50 are bonded together by a rectangular frame-shaped sealing member 71, and a liquid crystal layer 55 is maintained within an area between the opposing substrate 60 and the component substrate 50 that is surrounded by the sealing member 71. On a face of the component substrate 50 that faces the opposing substrate 60, a plurality of pixel electrodes 58 are formed by a translucent conductive film such as an ITO (Indium Tin Oxide) film or an IZO (Indium Zinc Oxide) film. In addition, on a face of the opposing substrate 60 that faces the component substrate 50, a common electrode 68 is formed by a translucent conductive film such as an ITO film. In addition, on the opposing substrate 60, color filters are formed. In a case where the image generating device 5 is an IPS (In Plane Switching) type or an FFS (Fringe Field Switching) type, the common electrode 68 is disposed on the component substrate 50 side. The component substrate 50 may be disposed on the display light emitting side of the opposing substrate 60. A driving IC 75 is built in an overhang area 59 of the component substrate 50 that overhangs from the edge of the opposing substrate 60 by using a COG technique, and the flexible wiring substrate 73 is connected to the overhang area 59. On the component substrate 50, a driving circuit may be formed simultaneously with a switching device disposed on the component substrate 50.

Detailed Configuration of Electrostatic Capacitance-Type Input Device 1

In the electrostatic capacitance-type input devices 1 shown in FIGS. 2A and 2B, the input panel 2 includes a translucent substrate 20 that is configured by a glass plate, a plastic plate, or the like. In this embodiment, a glass substrate is used as the substrate 20. In a case where the substrate 20 is formed from a plastic material, as the plastic material, a translucent sheet having heat resistance such as PET (polyethylene terephthalate), PC (polycarbonate), PES (polyether sulfone), PI (polyimide), or a cyclic olefin resin including polynorbornene or the like may be used. Hereinafter, the side of the substrate 20 on which an electrode and the like, to be described below, are formed will be described as the first face 20a, and the opposite side is described as the second face 20b.

Described in detail later, in the electrostatic capacitance-type input devices 1 shown in FIGS. 2A and 2B, on the first face 20a of the substrate 20, the first translucent conductive film 4a, an interlayer insulating film 214, and the second translucent conductive film 4b are formed from the lower layer side toward the upper layer side when viewed from the substrate 20. Thus, input position detecting electrodes 21 are formed by the first translucent conductive film 4a out of the first translucent conductive film 4a and the second translucent conductive film 4b. On the end portion 20e from among end portions 20e, 20f, 20g, and 20h of the substrate 20, the flexible wiring substrate 35 is connected to the first face 20a. To the input operation side of the substrate 20, a translucent cover 90 having an insulating property is attached by using an adhesive agent 90e or the like. In an area of the cover 90 that overlaps an outer area (the peripheral area 2b) of the input area 2a of the substrate 20, a light shielding layer 90a is printed. An area that is surrounded by the light shielding layer 90a is the input area 2a. The light shielding layer 90a overlaps the outer area of the electro-optical panel 5a and shields light leaking from the light source of the image generating device 5 or the end portion of the light guiding plate. In addition, a conductive film 99 used for shield, in which a translucent conductive film such as an ITO film is formed on a translucent film, is arranged between the input panel 2 and the liquid crystal panel 5a. In the configuration shown in FIG. 2B, the conductive film 99 and the substrate 20 are bonded together by an adhesive layer 99e or the like.

Schematic Configuration of Electrodes, Etc. of Electrostatic Capacitance-Type Input Device 1

Figure 3:
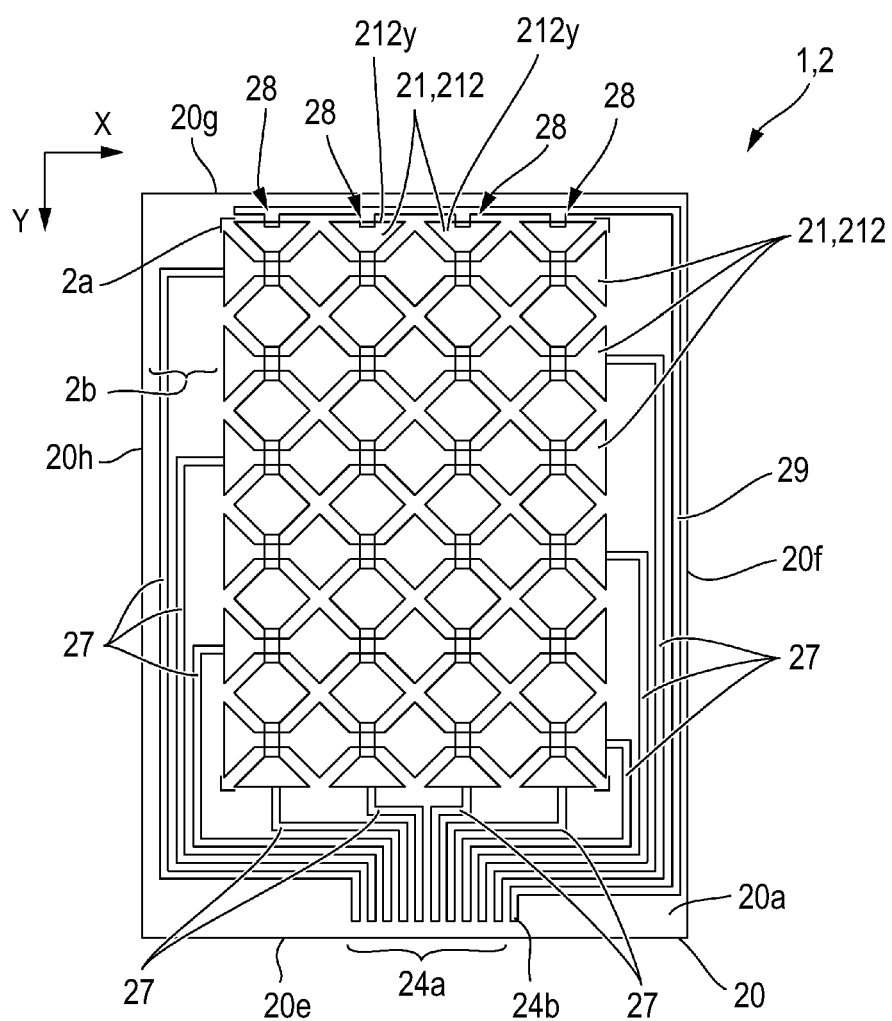
FIG. 3 is an explanatory diagram showing a schematic configuration of the substrate that is used in the electrostatic capacitance-type input device according to Embodiment 1 of the present application.

FIG. 3 is an explanatory diagram showing a schematic configuration of the substrate 20 that is used in the electrostatic capacitance-type input device 1 according to Embodiment 1 of the present application. In addition, in FIG. 3, the position of each corner portion of the input area 2a is denoted by a mark having a letter "L" shape.

As shown in FIG. 3, according to the electrostatic capacitance-type input device 1 of this embodiment, on the first face 20a of the substrate 20, a plurality of the first electrodes 211, which extend in the X direction (the first direction) in the input area 2a, used for detection of an input position and a plurality of the second electrodes 212, which extend in the Y direction (the second direction) intersecting with the X direction in the input area 2a, used for detection of an input position are formed. The input position detecting electrodes 21 are formed by the first electrodes 211 and the second electrodes 212. In addition, in a peripheral area 2b of the first face 20a of the substrate 20 corresponding to the outer side of the input area 2a, signal wirings 27 extending from end portions of the first electrode 211 on one side and signal wirings 27 extending from end portions of the second electrodes 212 on one side are formed. In addition, portions of the signal wirings 27 that are positioned on the end portion 20e are configured as the first mounting terminals 24a.

In addition, according to the electrostatic capacitance-type input device 1 of this embodiment, in the peripheral area 2b of the first face 20a of the substrate 20, test wirings 29 extending along the end portions 20g and 20f of the substrate 20 extend, and portions of the test wirings 29 that are located in the end portion 20e are configured as the second mounting terminal 24b. Here, between the other-side end portions 212y of the second electrodes 212 that are located on the end portion 20g side and the test wirings 29, short-circuit detecting portions 28 that respectively detect formation of a short circuit in the second electrodes 212 are configured.

Detailed Configuration of Input Position Detecting Electrodes 21 and Signal Wirings 27, Etc Hereinafter, with reference to FIGS. 4 to 6, the configurations of the input position detecting electrodes 21 (the first electrode 211 and the second electrode 212), the signal wiring 27, and the like will be described in detail, and then, the configurations of a test wiring 29 and the short-circuit detecting portion 28 will be described in detail.

Figure 4:
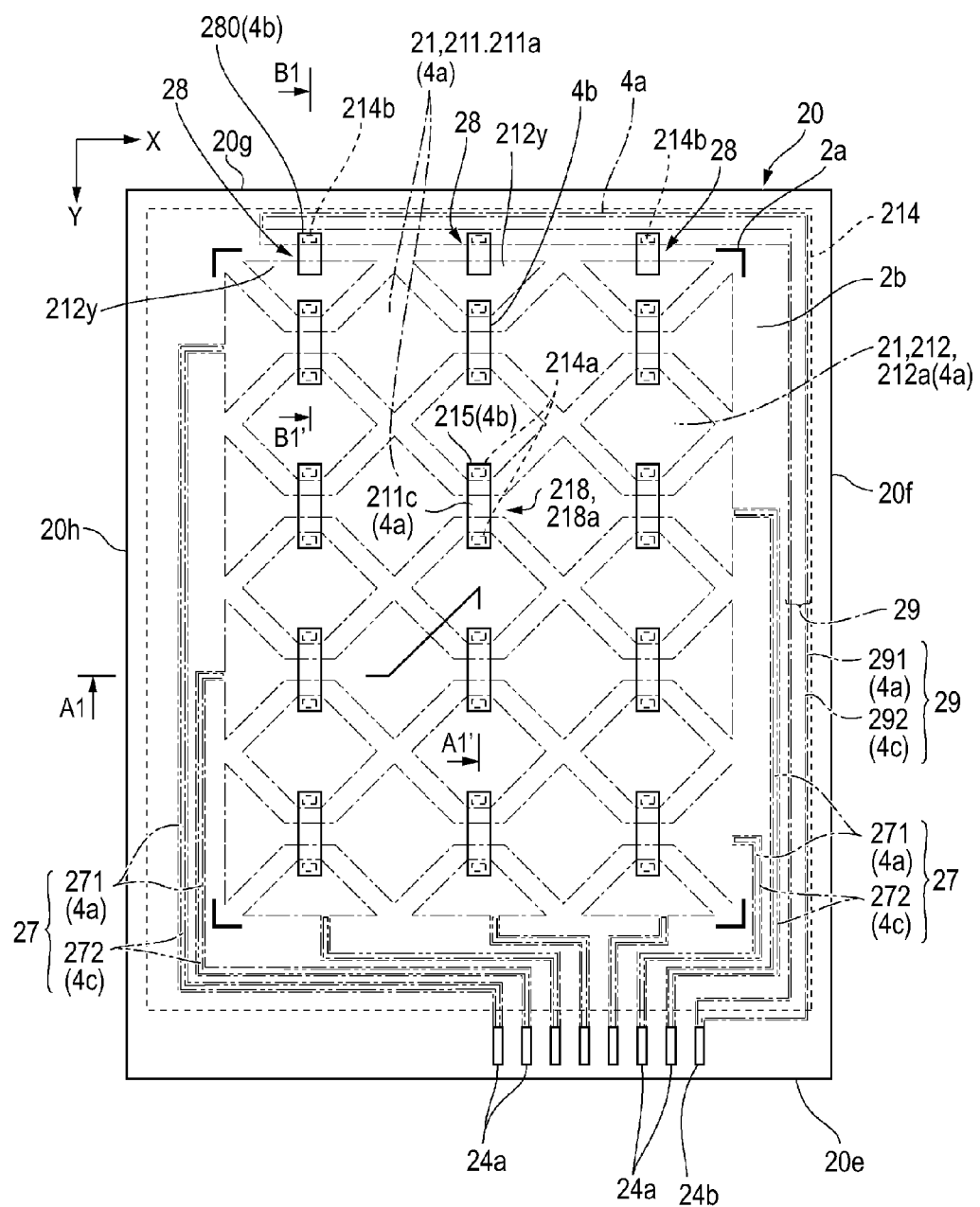
FIG. 4 is an explanatory diagram showing in detail the planar configuration of the substrate that is used in the electrostatic capacitance-type input device according to Embodiment 1 of the present application.
Figure 5A:
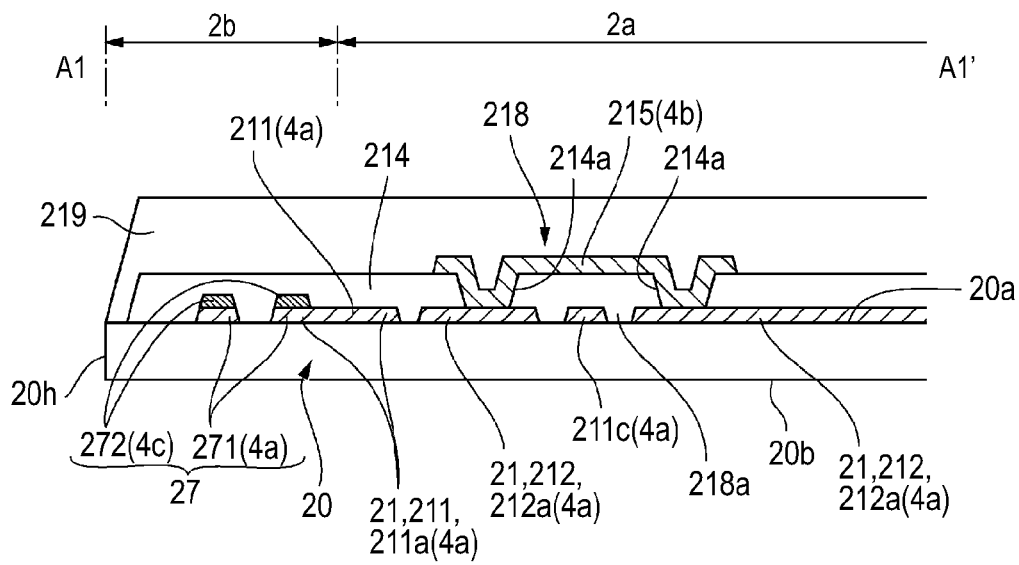
FIGS. 5A and 5B are explanatory diagrams showing the cross-sectional configurations of the substrate that is used in the electrostatic capacitance-type input devices according to Embodiment 1 of the present application.
Figure 5B:
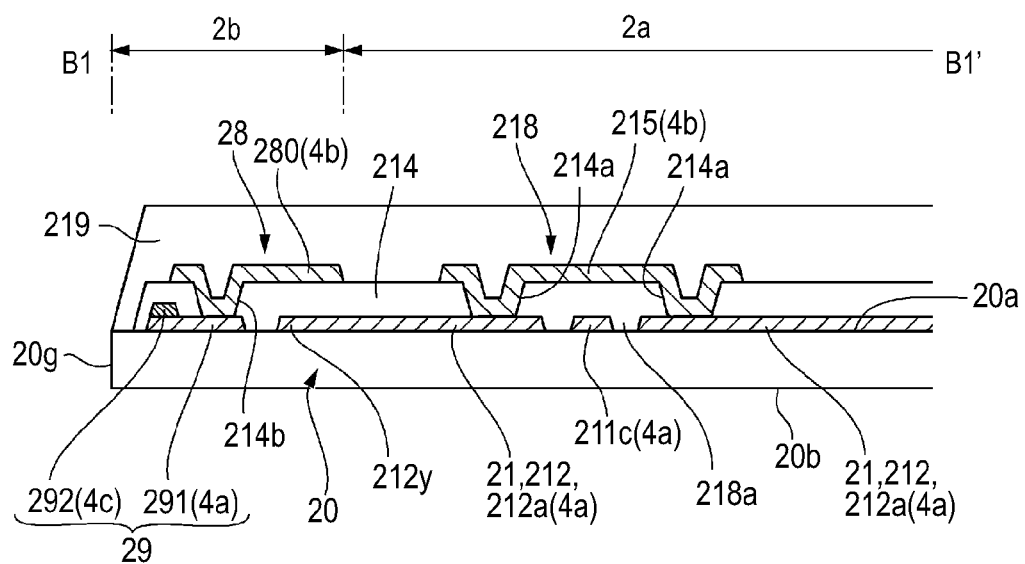

FIG. 4 is an explanatory diagram showing in detail the planar configuration of the substrate 20 that is used in the electrostatic capacitance-type input device 1 according to Embodiment 1 of the present application. FIGS. 5A and 5B are explanatory diagrams showing the cross-sectional configurations of the substrate 20 that is used in the electrostatic capacitance-type input devices 1 according to Embodiment 1 of the present application. FIG. 5A is a cross-sectional view of the substrate 20 taken along line A1-A1', and FIG. 5B is a cross-sectional view of the substrate 20 taken along line B1 to B1'. In FIG. 4, in order to allow each configuration to be easily understood, the number of the electrodes represented is decreased, and the electrodes are represented in an enlarged scale. In addition, in FIG. 4, the first translucent conductive film 4a is denoted by a dashed-dotted line, the interlayer insulating film 214 is denoted by a dotted line, the second translucent conductive film 4b is denoted by a solid line, and the wiring metal layer is denoted by a dashed two-dotted line. In FIG. 4, the position of each corner portion of the input area 2a is denoted by a mark having a letter "L" shape.

As shown in FIG. 4 and FIGS. 5A and 5B, according to the electrostatic capacitance-type input device 1 of this embodiment, on the first face 20a side of the substrate 20, the first translucent conductive film 4a, the interlayer insulating film 214, and the second translucent conductive film 4b are sequentially formed from the lower layer side toward the upper layer side when viewed from the substrate 20. In addition, on the first face 20a side of the substrate 20, in each portion of the first translucent conductive film 4a that configures the signal wiring 27, a metal film 4c is formed on the upper face of the first translucent conductive film 4a.

In this embodiment, the first translucent conductive film 4a is configured by a polycrystalline ITO film. In addition, on the upper layer side of the first translucent conductive film 4a, the interlayer insulating film 214 that is configured by a translucent insulating film such as a photosensitive resin film or a silicon oxide film is formed. In this embodiment, the second translucent conductive film 4b, similarly to the first translucent conductive film 4a, is configured by a polycrystalline ITO film. The metal film 4c is formed from an alloy of silver, palladium, and copper or the like. On the entirety of the first face 20a of the substrate 20, a translucent underlying protection film that is composed of a silicon oxide film or the like may be formed. In such a case, the first translucent conductive film 4a, the interlayer insulating film 214, and the second translucent conductive film 4b are sequentially stacked on the underlying protection film.

In the electrostatic capacitance-type input device 1 of this embodiment, the first translucent conductive film 4a, first, is formed as a plurality of rhombic areas in the input area 2a, and the rhombic areas configure pad portions 211a and 212a (large area portions) of the input position detecting electrodes 21 (the first electrode 211 and the second electrode 212). The pad portions 211a and 212a are alternately arranged in the X direction and the Y direction. Of a plurality of the pad portions 211a, the pad portions 211a that are adjacent to each other in the X direction (the first direction) are connected through a connection portion 211c, and the pad portion 211a and the connection portion 211c configure the first electrode 211 that extends in the X direction. In contrast, although a plurality of the pad portions 212a configure the second electrode 212 extending in the Y direction (the second direction), a portion between the pad portions 212a that are adjacent to each other in the Y direction, that is, the portion overlapping the connection portion 211c includes a disconnected portion 218a. In addition, the first translucent conductive film 4a is formed as a lower layer wiring 271 that configures the lower layer side of the signal wiring 27 in the peripheral area 2b.

The interlayer insulating film 214 is formed in a large area from the input area 2a to the peripheral area 2b. In the interlayer insulating film 214, contact holes 214a are formed. The contact holes 214a are formed in positions that overlap end portions of the pad portion 212a facing each other through the disconnected portion 218a.

The second translucent conductive film 4b is formed as a relay electrode 215 in an area overlapping the contact hole 214a.

In the peripheral area 2b, the metal film 4c is formed as an upper layer wiring 272 that configures the upper layer side of the signal wiring 27.

In addition, on the upper layer side of the second translucent conductive film 4b, a topcoat layer 219 that is formed from a photosensitive resin is formed on an approximately entire face of the substrate 20.

In the electrostatic capacitance-type input device 1 configured as described above, the first electrode 211 and the second electrode 212 are formed by the same conductive film (the first translucent conductive film 4a) and extend in directions intersecting with each other. Accordingly, on the substrate 20, there is an intersection portion 218 in which the first electrode 211 and the second electrode 212 intersect with each other.

Here, regarding the first electrode 211 and the second electrode 212, the first electrode 211 is connected in the X direction by the connection portion 211c, which is configured by the second translucent conductive film 4b, so as to extend even in the intersection portion 218. In contrast, in the second electrode 212, the disconnected portion 218a is configured in the intersection portion 218. However, in the intersection portion 218, the relay electrode 215 is formed in the upper layer of the interlayer insulating film 214. Thus, the relay electrode 215 electrically connects the pads 212a, which are adjacent to each other through the disconnected portion 218a, through the contact holes 214a of the interlayer insulating film 214. Accordingly, the second electrode 212 extends in the Y direction in the state of being electrically connected in the Y direction. In addition, the relay electrode 215 overlaps the connection portion 211c through the interlayer insulating film 214. Accordingly, there is no concern about formation of a short circuit.

The first electrode 211 and the second electrode 212 configured as described above include rectangle-shaped pad portions 211a and 212a having a large area in an area pinched by the intersection portions 218. The connection portion 211c positioned in the intersection portion 218 of the first electrode 211 is in a small-width shape having a width smaller than that of the pad portions 211a and 212a. In addition, the relay electrode 215 is also formed in a small-width shape with a width smaller than that of the pad portions 211a and 212a.

Here, the lower layer wiring 271 extends from one-side end portion of the first electrode 211 that is located on one side or the other side in the X direction, and, on the upper layer thereof, the upper layer wiring 272 is formed. In addition, the lower layer wiring 271 extends from a one-side end portion of the peripheral area 2b that is located on one side (the side on which the first mounting terminals 24a are located) in the Y direction, and on the upper layer thereof, the upper layer wiring 272 is formed.

Method of Detecting Input Position

As shown in FIG. 1B, in the electrostatic capacitance-type input device 1 of this embodiment, a driving IC 10 (a driving device or a short-circuit testing unit for an electrostatic capacitance-type input device) is connected to the first mounting terminals 24a and the second mounting terminal 24b of the input panel 2 through the flexible wiring substrate 35. Here, the driving IC 10 includes the first terminal 11a (signal terminal) that is electrically connected to the first mounting terminals 24a through the flexible wiring substrate 35 and a driving unit 110 that outputs position detecting signals VD shown in FIG. 1C to the first terminals 11a. In addition, the driving IC 10 includes a capacitance measuring unit 120 that measures the capacitance coupled with each of the plurality of the first terminals 11a. Furthermore, the driving IC 10 includes the second terminal 11b (a test terminal) that is electrically connected to the second mounting terminal 24b through the flexible wiring substrate 35 and a short-circuit determining unit 130 that determines whether there is the first terminal 11a having a capacitance value that is equal to or less than a set value based on the capacitance measuring result of the capacitance measuring unit 120. The second terminal 11b and the short-circuit determining unit 130 are used for detecting a short circuit to be described later. Accordingly, the driving IC 10 also serves as a short-circuit testing unit as described below. In addition, although the driving IC 10 includes a ground terminal that outputs a ground electric potential to the input panel 2, it is not directly related to an embodiment, and thus, the drawing and the description thereof are omitted here.

In the electrostatic capacitance-type input device 1 configured as described above, when the driving IC 10 shown in FIG. 1B outputs a position detecting signal VD having a rectangular pulse shape shown in FIG. 1C from the first terminal 11a, in a case where capacitance is not parasitic on the input position detecting electrode 21, a signal having a waveform denoted by a solid line shown in FIG. 1C is detected from the first terminal 11a. In contrast, when capacitance is parasitic on the input position detecting electrode 21, as denoted by a dotted line shown in FIG. 1C, the waveform is distorted due to the capacitance. Accordingly, the driving unit 110 can detect whether or not capacitance is parasitic on the input position detecting electrode 21. Therefore, according to this embodiment, electrostatic capacitance coupled with each of the input position detecting electrodes 21 is monitored by sequentially outputting the position detecting signals VD to a plurality of the input position detecting electrodes 21. Thus, when a finger is in proximity to any of the plurality of the input position detecting electrodes 21, the electrostatic capacitance of the input position detecting electrode 21 to which the finger is in proximity increases by the amount corresponding to the electrostatic capacitance generated between the finger and the input position detecting electrode. Accordingly, the electrode to which the finger is in proximity can be specified.

Thus, when formation of a short-circuit occurs in one spot of the input position detecting electrodes (the first electrodes 211 and the second electrodes 212) in the substrate 20, it is difficult to perform detection for the row thereof. Accordingly, in this embodiment, the configuration described below is employed, and formation of a short circuit in the second electrode 212 is detected, in which formation of a short circuit can easily occur out of the first electrode 211 and the second electrode 212.

Configuration for Detecting Short-Circuit

In this embodiment, in order to detect formation of a short circuit in the second electrodes 212, on the first face 20a of the substrate 20, a test electrode 280 is disposed that faces the other-side end portion 212y (the end portion located on the side of the end portion 20g of the substrate 20) located opposite to the one-side end portion of the second electrode 212, to which the signal wiring 27 is connected, through the interlayer insulating film 214. Thus, a short-circuit detecting portion 28 is configured by a portion in which the other-side end portion 212y of the second electrode 212 and the test electrode 280 face each other.

Here, the test electrode 280 is formed from the second translucent conductive film 4b and is formed in a reed shape extending toward the input area 2a. Accordingly, the end portion of the test electrode 280 overlaps the other-side end portion 212y of the second electrode 212, which is formed from the first translucent conductive film 4a, in the thickness direction through the interlayer insulating film 214. Accordingly, the short-circuit detecting portion 28 is configured by capacitance coupled between the test electrode 280 and the second electrode 212.

In addition, in the peripheral area 2b of the first face 20a of the substrate 20, the test wiring 29 that extends along the end portions 20g and 20f of the substrate 20 extends, and the portion of the test wiring 29 located on the end portion 20e becomes the second mounting terminal 24b.

The test wiring 29 is configured by a lower layer wiring 291 that is formed from the first translucent conductive film 4a and an upper layer wiring 292 that is formed from a metal layer 4c formed along the upper face of the lower layer wiring 291. In a portion of the test wiring 29 along the end portion 20e, the width dimension of the upper layer wiring 292 formed from the metal film 4c is decreased, compared to that of the lower layer wiring 291 that is formed from the first translucent conductive film 4a. Accordingly, a greater portion of the lower layer wiring 291 overhangs from the upper layer wiring 292 to the side on which the input area 2a is located in the width direction. Thus, in this embodiment, a contact hole 214b is formed in an area of the interlayer insulating film 214 that overlaps the portion in which the lower layer wiring 291 overhangs in the width direction from the upper layer wiring 292, and the lower layer wiring 291 of the test wiring 29 and the test electrode 280 are electrically connected to each other through the contact hole 214b.

Such a test electrode 280 can be formed as a test electrode that is common to the plurality of the second electrodes 212. However, in this embodiment, the test electrodes 280 are formed so as to have one-to-one relationship with the plurality of the second electrodes 212. Accordingly, a plurality of the test electrodes 280 are formed, and the test wiring 29 is electrically connected to the plurality of test electrodes 280. In this embodiment, all the plurality of the test electrodes 280 are electrically connected to the common test wiring 29. Accordingly, although there are a plurality of the second electrodes 212, only one test wiring 29 is formed.

Principle of Detection of Short Circuit

Figure 6:
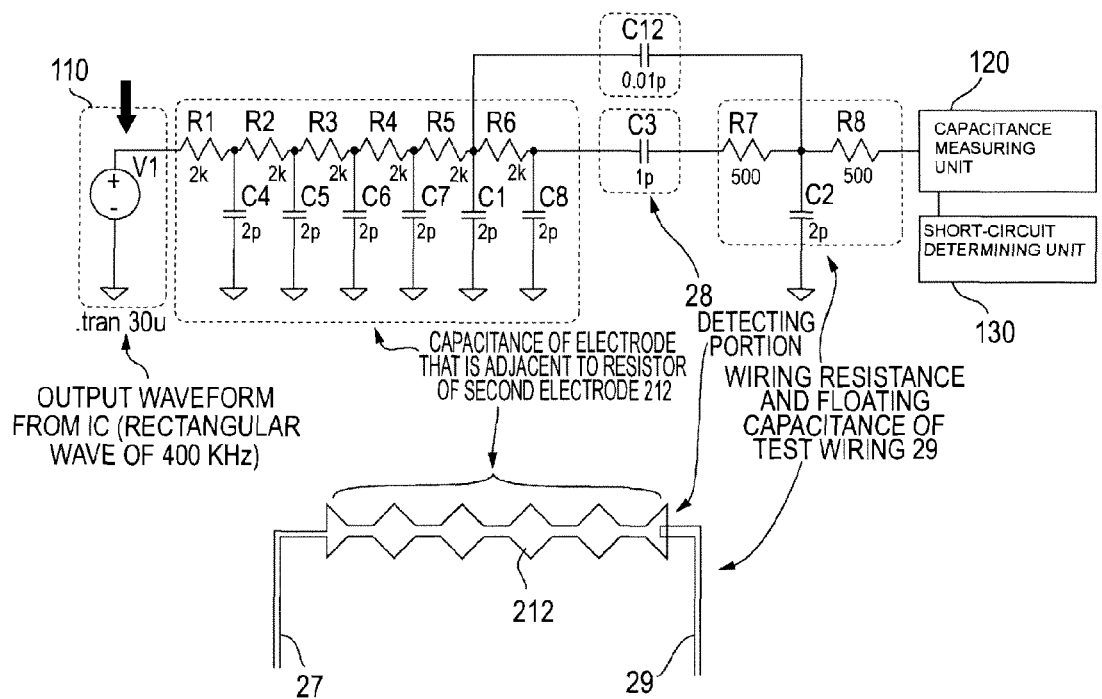
FIG. 6 is an explanatory diagram representing the principle of detection of a short circuit using the electrostatic capacitance-type input device according to Embodiment 1 of the present application.

FIG. 6 is an explanatory diagram representing the principle of detection of a short circuit using the electrostatic capacitance-type input device 1 according to Embodiment 1 of the present application.

In the electrostatic capacitance-type input device 1 of this embodiment, in order to detect formation of a short circuit in the second electrode 212 by using the short-circuit detecting portion 28 including the above-described test electrode 280 and the test wiring 29, the driving IC 10 shown in FIG. 1B sequentially measures the capacitance values between the plurality of the first terminals 11a and the second terminal 11b by using the capacitance measuring unit 120 while sequentially outputting test signals having a pulse shape to the plurality of the first terminals 11a as shown in FIG. 1C. Then, the short-circuit determining unit 130 determines whether or not there is a first terminal 11a with a capacitance value equal to or less than a set value based on the capacitance measurement result of the capacitance measuring unit 120.

In other words, as shown in FIG. 6, between the signal wiring 27 and the test wiring 29, in addition to various types of resistance R1 to R8, there are parasitic capacitance C4 to C8 between the second electrode 212 and an electrode adjacent thereto, capacitance C3 of the short-circuit detecting portion 28, parasitic capacitance C12 between the test wiring 29 and the second electrode 212, parasitic capacitance C2 between the test wiring 29 and the signal wiring 27, and the like. However, when the second electrode 212 is short-circuited, capacitance between the test wiring 29 and the signal wiring 27 is not detected at all. Alternatively, when the second electrode 212 is short-circuited, only extremely low capacitance is detected between the test wiring 29 and the signal wiring 27. Accordingly, even in a case where capacitance coupled with the second electrode 212 already presents, the short-circuit determining unit 130 can reliably detect the formation of a short circuit in the second electrode 212, whereby the driving IC 10 serves as the short-circuit testing unit.

Major Advantages of this Embodiment

As described above, the electrostatic capacitance-type input device 1 of this embodiment has the test electrode 280 that faces the other-side end portion 212y of the second electrode 212 through the interlayer insulating film 214 and the test wiring 29 that is electrically connected to the test electrode 280 on the substrate 20. Accordingly, by sequentially measuring capacitance values between the test wiring 29 and a plurality of the signal wirings 27, it can be determined that a short circuit is formed in the second electrode 212 to which the signal wiring 27 having a capacitance value equal to or less than a set value is electrically connected. According to such a configuration, even in a case where other capacitance is coupled with the second electrode 212, when formation of a short circuit occurs, capacitance between the test wiring 29 and the signal wiring 27 is not detected at all or extremely low capacitance is detected. Accordingly, even in a case where capacitance coupled with the second electrode 212 is already present, formation of a short circuit in the second electrode 212 can be reliably detected.

In addition, since it suffices that the capacitance values between the test wiring 29 and the signal wirings 27 that are formed on the substrate 20 are measured, there is an advantage in that a large-scale test device is not necessary. Furthermore, since a capacitance value between the second electrode 212 and the test electrode 280 is constant, and the capacitance value is small, the position detection is not hindered even in a case where the test electrode 280 is disposed.

In addition, according to this embodiment, the test electrode 280 overlaps the other-side end portion 212y of the second electrode 212 in the thickness direction through the interlayer insulating film 214. Accordingly, since the first electrode or the second electrode and the test electrode can be coupled with capacitance of an appropriate capacitance value, the capacitance values between the test wiring 29 and the signal wirings 27 can be reliably measured.

In addition, according to this embodiment, a structure in which the disconnected portion of the second electrode 212 is connected to the relay electrode 215 is employed. Accordingly, formation of a short circuit can occur comparatively easily in the second electrode 212, than in the first electrode 211. However, in order for the formation of a short circuit in the second electrode 212 to be detected, the electrostatic capacitance-type input device 1 of this embodiment has high reliability.

In addition, according to this embodiment, although the test electrode 280 is independently disposed for each second electrode 212, the test wiring 29 is electrically connected to all the test electrodes 280. Accordingly, there may be at least one test wiring 29, and therefore it is advantageous for a space used for disposing the test wiring 29 to be small.

Furthermore, according to this embodiment, detection of a short circuit is performed by using the driving IC 10 that is used for position detecting. Thus, after the driving IC 10 is connected, in addition to being regularly performed during the manufacturing process of the electrostatic capacitance-type input device 1 and before shipment of the electrostatic capacitance-type input device 1, detection of a short circuit can be regularly performed even in a case where the electrostatic capacitance-type input device 1 is used after shipment.

Embodiment 2

Figure 7:
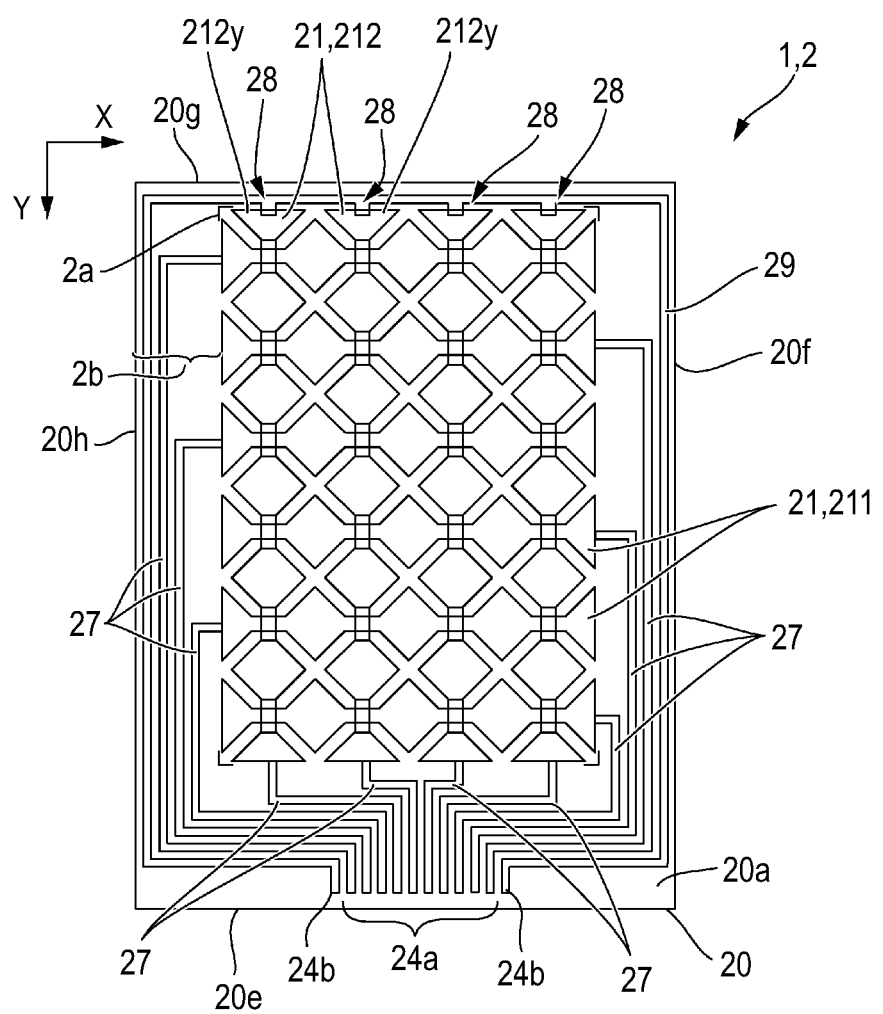
FIG. 7 is an explanatory diagram showing a schematic configuration of a substrate that is used in an electrostatic capacitance-type input device according to Embodiment 2 of the present application.

FIG. 7 is an explanatory diagram showing a schematic configuration of a substrate 20 that is used in an electrostatic capacitance-type input device 1 according to Embodiment 2 of the present application. The basic configuration of this embodiment is the same as that of Embodiment 1. Thus, to each common part, the same reference sign is assigned, and detailed description thereof is omitted.

As shown in FIG. 7, according to the electrostatic capacitance-type input device 1 of this embodiment, similarly to Embodiment 1, on the first face 20a of the substrate 20, a plurality of the first electrodes 211, which extend in the X direction (the first direction) in the input area 2a, used for detection of an input position and a plurality of the second electrodes 212, which extend in the Y direction (the second direction) intersecting with the X direction in the input area 2a, used for detection of an input position are formed. The input position detecting electrodes 21 are formed by the first electrodes 211 and the second electrodes 212. In addition, in a peripheral area 2b of the first face 20a of the substrate 20 corresponding to the outer side of the input area 2a, signal wirings 27 extending from end portions of the first electrode 211 on one side and signal wirings 27 extending from end portions of the second electrodes 212 on one side are formed. In addition, portions of the signal wirings 27 that are positioned on the end portion 20e are configured as the first mounting terminals 24a.

In addition, in the peripheral area 2b of the first face 20a of the substrate 20, a test wiring 29 extending along the end portions 20g and 20f of the substrate 20 extend, and portions of the test wiring 29 that are located in the end portion 20e are configured as the second mounting terminal 24b. Here, between the other-side end portions 212y of the second electrodes 212 that are located on the end portion 20g side and the test wiring 29, the short-circuit detecting portions 28 that are described with reference to FIG. 4 and FIGS. 5A and 5B are configured. Accordingly, formation of a short circuit in the second electrode 212 can be tested.

Here, a test wiring 29 surrounds three sides on which the end portions 20f, 20g, and 20h of the substrate 20 are located in the periphery of the input area 2a. In addition, both end portions of the test wiring 29 that are located on the end portion 20e of the substrate 20 become the second mounting terminals 24b, and the second mounting terminals 24b are formed on both sides of the first mounting terminals 24a pinched therebetween.

Accordingly, in this embodiment, similarly to Embodiment 1, formation of a short circuit in the second electrode 212 can be detected. In addition, during a period during which the electrostatic capacitance-type input device 1 is used, when a shield electric potential is applied to the test wiring 29 from the driving IC 10 shown in FIG. 1B, penetration of electromagnetic wave noise into the input area 2a from the periphery of the substrate 20 can be prevented. As the shield electric potential, the ground electric potential may be applied to the test wiring 29. However, by applying a shield electric potential that has the same waveform (including the phase) as that of the position detecting signal VD shown in FIG. 1C, a state in which capacitance is not parasitic between the input position detecting electrode 21 and the test wiring 29 (shield wiring) can be realized. Therefore, even in a case where the shield wiring (the test wiring 29) is disposed on the substrate 20, detection of an input position by using the electrostatic capacitance method is not hindered.

Embodiment 3

Figure 8:
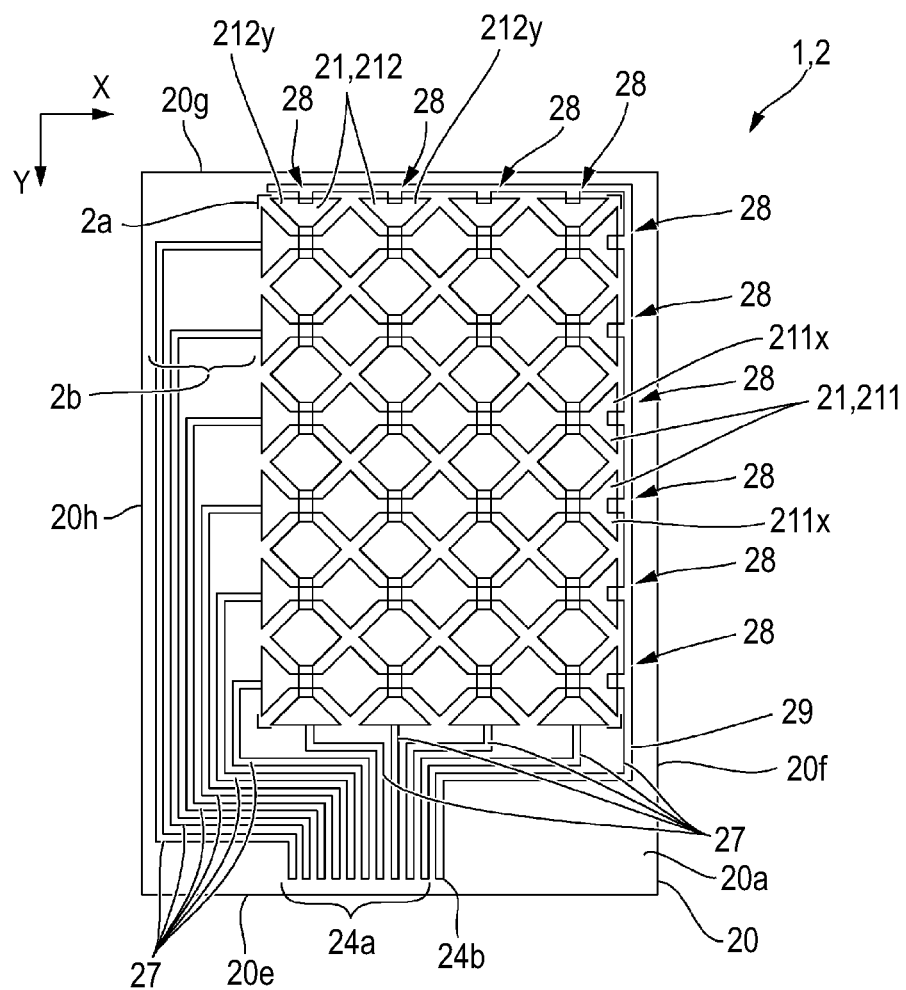
FIG. 8 is an explanatory diagram showing a schematic configuration of a substrate that is used in an electrostatic capacitance-type input device according to Embodiment 3 of the present application.

FIG. 8 is an explanatory diagram showing a schematic configuration of a substrate 20 that is used in an electrostatic capacitance-type input device 1 according to Embodiment 3 of the present application. The basic configuration of this embodiment is the same as that of Embodiment 1. Thus, to each common part, the same reference sign is assigned, and the description thereof is omitted.

As shown in FIG. 8, according to the electrostatic capacitance-type input device 1 of this embodiment, similarly to Embodiment 1, on the first face 20a of the substrate 20, a plurality of the first electrodes 211, which extend in the X direction (the first direction) in the input area 2a, used for detection of an input position and a plurality of the second electrodes 212, which extends in the Y direction (the second direction) intersecting with the X direction in the input area 2a, used for detection of an input position are formed. The input position detecting electrodes 21 are formed by the first electrodes 211 and the second electrodes 212. In addition, in a peripheral area 2b of the first face 20a of the substrate 20 corresponding to the outer side of the input area 2a, signal wirings 27 extending from end portions of the first electrode 211 on one side and signal wirings 27 extending from end portions of the second electrodes 212 on one side are formed. In addition, portions of the signal wirings 27 that are positioned on the end portion 20e are configured as the first mounting terminals 24a.

In addition, in the peripheral area 2b of the first face 20a of the substrate 20, a test wiring 29 extending along the end portions 20g and 20f of the substrate 20 extend, and a portion of the test wirings 29 that are located in the end portion 20e is configured as the second mounting terminal 24b. Here, between the other-side end portions 212y of the second electrodes 212 that are located on the end portion 20g side and the test wiring 29, the short-circuit detecting portions 28 that are described with reference to FIG. 4 and FIGS. 5A and 5B are configured.

Here, all the signal wirings 27 that extend from the second electrodes 212 extend on one side (the end portion 20h side) in the X direction and are not present on the other side (the end portion 20f side) in the X direction. Thus, in this embodiment, on the end portion 20f side of the substrate 20, the short-circuit detecting portion 28 described with reference to FIG. 4 and FIGS. 5A and 5B is configured also between the other-side end portion 211x of the first electrode 211 that is located on the end portion 20f side and the test wiring 29.

Therefore, according to this embodiment, detection of a short circuit in both the first electrodes 211 and the second electrodes 212 can be performed.

Embodiment 4

Figure 9:
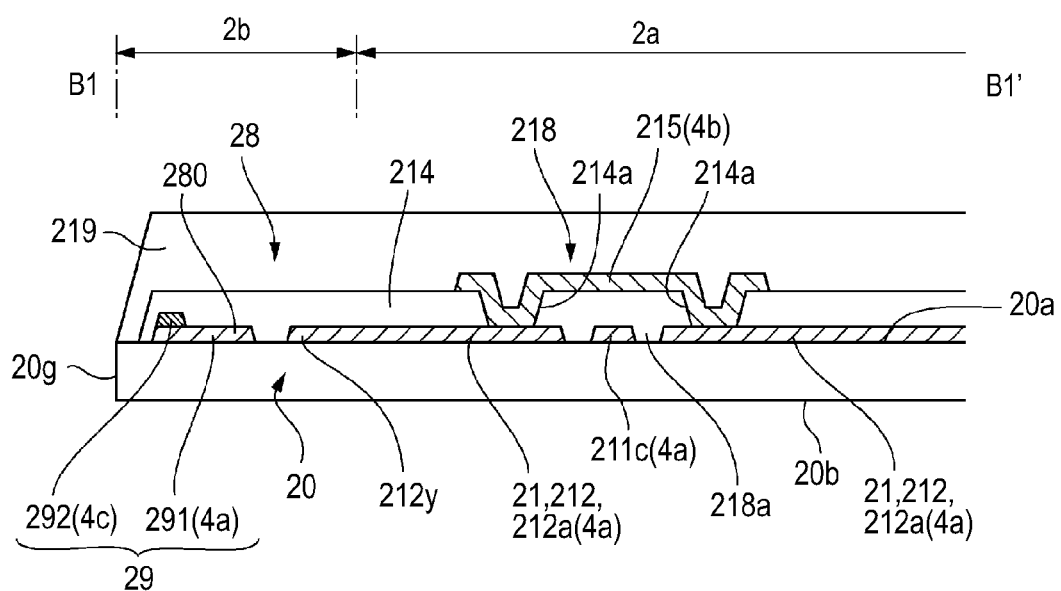
FIG. 9 is an explanatory diagram of a short-circuit detecting portion that is formed in an electrostatic capacitance-type input device according to Embodiment 4 of the present application.

FIG. 9 is an explanatory diagram of a short-circuit detecting portion 28 that is formed in an electrostatic capacitance-type input device 1 according to Embodiment 4 of the present application. In the above-described Embodiments 1 to 3, a configuration in which the test electrode 280 overlaps the other-side end portion 212y of the second electrode 212 in the thickness direction through the interlayer insulating film 214 is employed in configuring the short-circuit detecting portion 28. In contrast, in this embodiment, as shown in FIG. 9, the short-circuit detecting portion 28 is configured by using a side end portion of the test wiring 29 that faces the other-side end portion 212y of the second electrode 212 in the horizontal direction through the interlayer insulating film 214 as the test electrode 280.

Even in a case where such a configuration is employed, the test electrode 280 and the other-side end portion 212y of the second electrode 212 are coupled together due to fringe capacitance that is caused by a horizontal electric field applied between the test electrode 280 and the other-side end portion 212y of the second electrode 212. Accordingly, formation of a short circuit in the second electrodes 212 can be performed. In addition, according to the configuration shown in FIG. 9, there is an advantage in that a space in which the test electrode 280 is disposed can be further decreased.

Other Embodiments

In the above-described embodiments, a liquid crystal device is used as the image generating device 5. However, as the image generating device 5, an organic electroluminescent device or an electronic paper device may be used.

Examples of Mounting in Electronic Apparatus

Figure 10A:
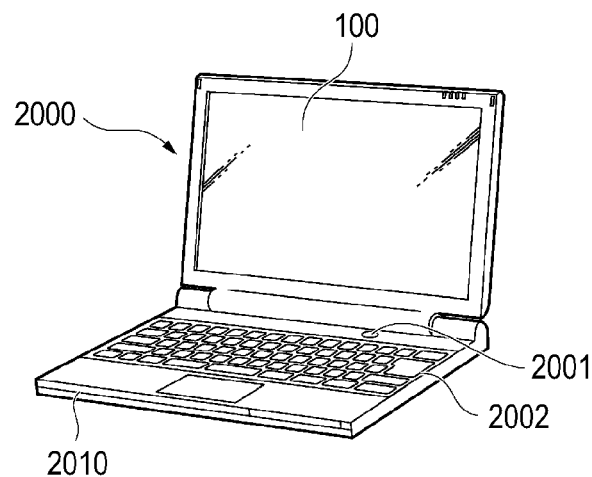
FIGS. 10A to 10C are explanatory diagrams of electronic apparatuses having an electrostatic capacitance-type input device according to an embodiment.
Figure 10B:
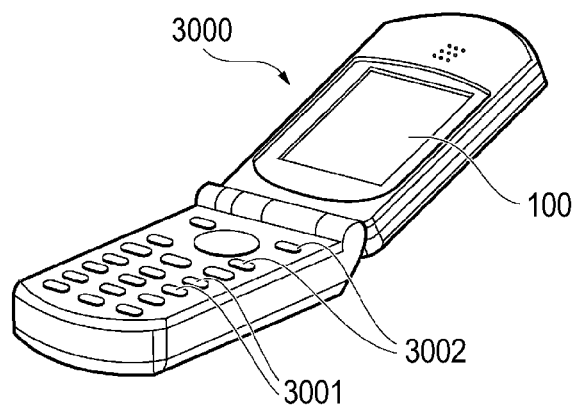
Figure 10C:
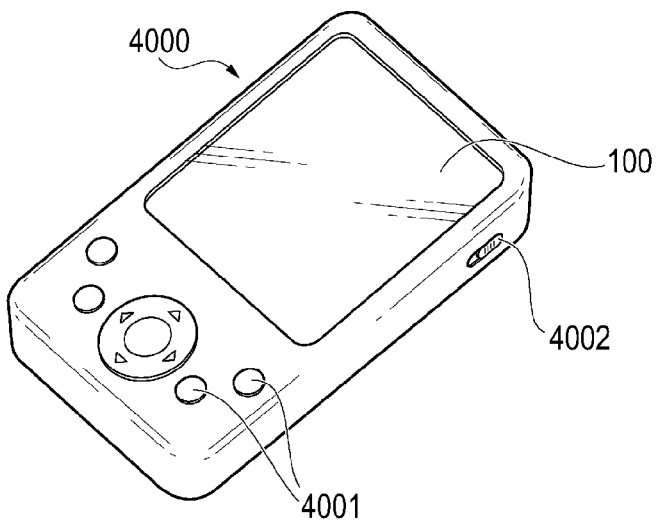
Figure 11:
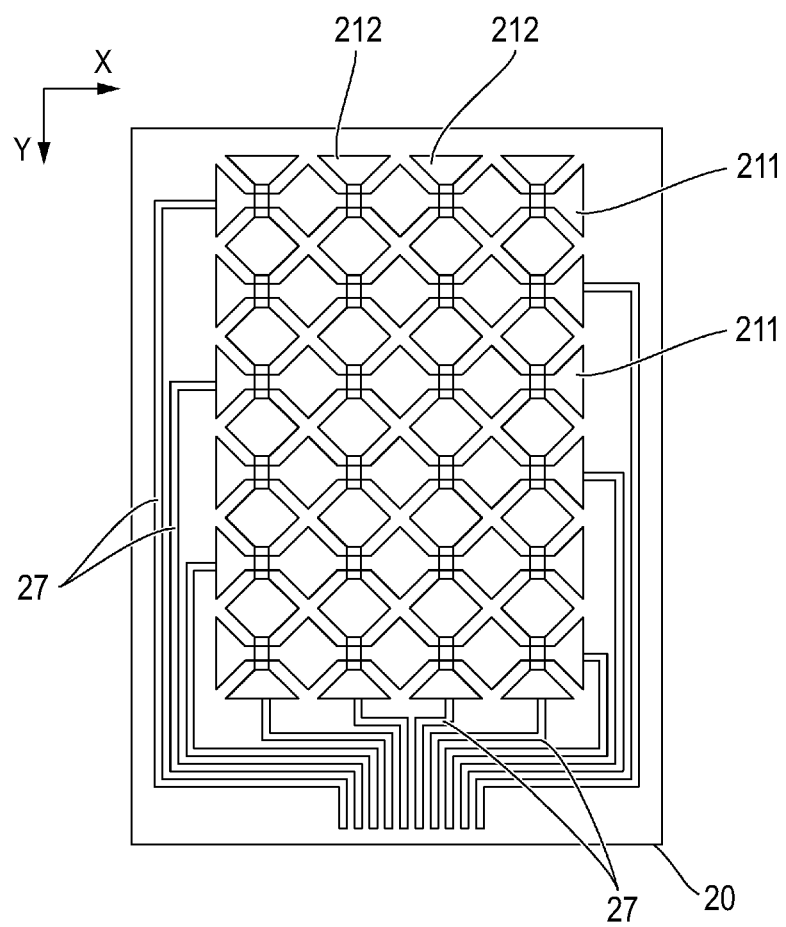
FIG. 11 is an explanatory diagram of an electrostatic capacitance-type input device in related art.

Next, electronic apparatuses to which input device-attached electro-optical apparatuses 100 according to the above-described embodiments are applied will be described. FIG. 10A shows the configuration of a mobile-type personal computer including the input device-attached electro-optical apparatus 100. The personal computer 2000 includes the input device-attached electro-optical apparatus 100 as a display unit and a main body unit 2010. In the main body unit 2010, a power switch 2001 and a keyboard 2002 are disposed. FIG. 10B shows the configuration of a cellular phone including the input device-attached electro-optical apparatus 100. The cellular phone 3000 includes a plurality of operation buttons 3001, scroll buttons 3002, and the input device-attached electro-optical apparatus 100 as a display unit. By operating the scroll buttons 3002, the screen displayed in the input device-attached electro-optical apparatus 100 is scrolled. FIG. 10C shows the configuration of a personal digital assistant (PDA) to which the input device-attached electro-optical apparatus 100 is applied. The personal digital assistant 4000 has a plurality of operation buttons 4001, a power switch 4002, and the input device-attached electro-optical apparatus 100 as a display unit. When the power switch 4002 is operated, various types of information such as an address list or a schedule book are displayed in the input device-attached electro-optical apparatus 100.

In addition, as examples of electronic apparatuses, to which the input device-attached electro-optical apparatus 100 is applied, other than the electronic apparatuses shown in FIGS. 10A to 10C, there are electronic apparatuses such as a digital still camera, a liquid crystal television set, a view finder-type or monitor direct-viewing-type video cassette recorder, a car navigation system, a pager, an electronic organizer, a calculator, a word processor, a workstation, a television phone, a POS terminal, a banking terminal, and the like. As a display unit of the above-described various electronic apparatuses, the above-described input device-attached electro-optical apparatus 100 can be applied.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electrostatic capacitance-type input device comprising:
   a plurality of first electrodes, which detect an input position, extending in a first direction in an input area on a substrate;
   a plurality of second electrodes, which detect an input position, extending in a second direction intersecting with the first direction in the input area;
   a plurality of signal wirings that extend from one-side end portions of the first electrodes and one-side end portions of the second electrodes on the substrate;
   a test electrode that faces, and is capacitively coupled with, the other-side end portions of at least one of the first electrodes and the second electrodes through an insulating film on the substrate;
   a test wiring that is electrically connected to the test electrode; and
   a short-circuit testing unit that is electrically connected to the test wiring and the plurality of signal wirings,
   wherein the short-circuit testing unit measures capacitance values between the test wiring and the plurality of signal wirings and determines that the electrode out of the first electrodes and the second electrodes, which has a capacitance value equal to or less than a set value, and to which the signal wirings are electrically connected is short-circuited.

2. The electrostatic capacitance-type input device according to claim 1, wherein the test electrode overlaps the other-side end portions in a thickness direction through the insulating film so as to face the other-side end portions.

3. The electrostatic capacitance-type input device according to claim 2, further comprising:
   a relay electrode that electrically connects the second electrodes disconnected in intersection portions to each other on the substrate,
   wherein the second electrodes are disconnected in the intersection portions with the first electrodes, and
   wherein the test electrode is disposed at least in the other-side end portion of the second electrodes.

4. The electrostatic capacitance-type input device according to claim 2, wherein the test electrode is disposed in the other-side end portions of the first electrodes and the other-side end portions of the second electrodes.

5. The electrostatic capacitance-type input device according to claim 1,
   wherein the test electrode includes a plurality of test electrodes that are independently disposed for each of the other-side end portions, and wherein the test wiring is electrically connected to a plurality of the test electrodes.

6. The electrostatic capacitance-type input device according to claim 5, wherein the test wiring is electrically connected to all the test electrodes.

7. The electrostatic capacitance-type input device according to claim 1, wherein the test wiring extends so as to surround at least three sides of the input area.

8. A method of testing an electrostatic capacitance-type input device including a plurality of first electrodes, which detect an input position, extending in a first direction in an input area on a substrate, a plurality of second electrodes, which detect an input position, extending in a second direction intersecting with the first direction in the input area; and a plurality of signal wirings that extend from one-side end portions of the first electrodes and one-side end portions of the second electrode, wherein a test electrode that faces, and is capacitively coupled with, the other-side end portions of at least one of the first electrodes and the second electrodes through an insulating film and a test wiring that is electrically connected to the test electrode are disposed, the method comprising the steps of:

measuring capacitance values between the test wiring and the plurality of signal wirings; and determining that the electrode out of the first electrodes and the second electrodes, which has a capacitance value equal to or less than a set value, and to which the signal wirings are electrically connected is short-circuited.

9. A driving device for an electrostatic capacitance-type input device including a plurality of first electrodes, which detect an input position, extending in a first direction in an input area on a substrate, a plurality of second electrodes, which detect an input position, extending in a second direction intersecting with the first direction in the input area; and a plurality of signal wirings that extend from one-side end portions of the first electrodes and one-side end portions of the second electrode, the driving device comprising:

a plurality of signal terminals that output position detecting signals to the signal wirings;

a driving unit that supplies position detecting signals to the signal terminals;

a test terminal that is capacitively coupled with the plurality of signal terminals;

a capacitance measuring unit that measures capacitance values between the test terminal and the plurality of signal terminals; and a short-circuit determining unit that determines whether or not there is the signal terminal having a capacitance value equal to or less than a set value based on a capacitance measuring result of the capacitance measuring unit.

* * * * *